United States Patent [19]

Nimishakavi et al.

[11] Patent Number: 5,471,588
[45] Date of Patent: Nov. 28, 1995

[54] TECHNIQUE AND CIRCUIT FOR PROVIDING TWO OR MORE PROCESSORS WITH TIME MULTIPLEXED ACCESS TO A SHARED SYSTEM RESOURCE

[75] Inventors: Hanumanthrao Nimishakavi, Fremont; Ravi Swami, San Jose, both of Calif.

[73] Assignee: Zilog, Inc., Campbell, Calif.

[21] Appl. No.: 981,889

[22] Filed: Nov. 25, 1992

[51] Int. Cl.⁶ .................................................... G06F 13/00
[52] U.S. Cl. ............................ 395/293; 364/DIG. 1; 364/231.5; 364/238; 364/238.5; 364/238.6; 364/230; 364/243.6; 395/729
[58] Field of Search ................................. 395/725, 425, 395/325, 275; 364/134; 370/100, 66

[56] References Cited

U.S. PATENT DOCUMENTS

| | | | |
|---|---|---|---|
| 4,183,058 | 1/1980 | Taylor | 358/127 |
| 4,247,936 | 1/1981 | Husting | 370/100 |
| 4,415,991 | 11/1983 | Chu et al. | 365/77 |
| 4,443,846 | 4/1984 | Adcock | 395/325 |
| 4,488,290 | 12/1984 | Dunn et al. | 370/66 |
| 4,630,193 | 12/1986 | Kris | 395/325 |
| 4,649,475 | 3/1987 | Scheuneman | 395/425 |
| 4,818,932 | 4/1989 | Odenheimer | 324/121 R |
| 5,010,476 | 4/1991 | Davis | 395/325 |
| 5,047,921 | 9/1991 | Kinter et al. | 364/134 |
| 5,233,603 | 8/1993 | Takeuchi et al. | 370/60 |
| 5,245,311 | 9/1993 | Honna | 340/146.2 |
| 5,317,501 | 5/1994 | Hilpert | 364/134 |
| 5,323,488 | 6/1994 | Udagawa | 395/425 |

*Primary Examiner*—Jack B. Harvey
*Assistant Examiner*—Ayaz R. Sheikh
*Attorney, Agent, or Firm*—Majestic, Parsons, Siebert & Hsue

[57] ABSTRACT

A time multiplexing technique and corresponding circuitry which provides controlled access to one processor at a time of two or more access requesting processors, to a system resource shared by the two or more processors. Each of the access requesting processors is connected to an input of a plurality of multiplexers. Each of the multiplexers has a select input which determines which of the multiplexer's inputs becomes its output which is in turn, connected to an appropriate input of the system resource. By connecting together the select inputs of the multiplexers, access to the shared system resource is alternated between the two or more processors by alternating the value of the select input in response to the system clock.

2 Claims, 3 Drawing Sheets

TECHNIQUE AND CIRCUIT FOR PROVIDING TWO OR MORE PROCESSORS WITH TIME MULTIPLEXED ACCESS TO A SHARED SYSTEM RESOURCE

BACKGROUND OF THE INVENTION

This invention relates in general to techniques and circuitry for providing controlled access by one processor at a time of two or more processors, to a system resource shared by the two or more processors and in particular, to a time multiplexing technique and corresponding circuitry to provide such access.

Conventionally, arbiter circuitry is interposed between a system resource and two or more processors sharing access to that resource. If two or more processors request access to the resource at the same time, the arbiter circuitry determines which of the two or more processors is to be allowed access by a first-in-time and/or priority scheme. This prevents two or more processors from simultaneously accessing and/or modifying the contents of the shared resource and as a consequence, one processor contaminating the contents of the resource for the other processors.

Inclusion of arbiter circuitry in an integrated circuit chip, however, increases the size and complexity of the chip and as a result, can increase its cost and reduce its performance. Further, additional protocol handling requirements on the access requesting processors is required in order to interface with the arbiter circuitry and as a result, can interfere with the execution of other important activities being conducted by these processors.

OBJECTS AND SUMMARY OF THE INVENTION

Accordingly, one object of the present invention is to develop a technique and related circuitry for providing controlled access by one processor at a time of two or more processors, to a system resource shared by the two or more processors, without the aforementioned disadvantages of arbiter circuitry.

These and additional objects are accomplished by the various aspects of the present invention. One aspect of the invention accomplishes one or more of these objects by a method for sharing access to an electronic device between a plurality of access requesting devices, comprising the steps of: (a) establishing a sequential order in which the access requesting devices will be allowed access to the electronic device; (b) receiving a clock signal; and (c) providing access to a different one of the plurality of access requesting devices in a circular fashion using the established sequential order upon each new cycle of the clock signal.

Another aspect of the present invention is a method for sharing access to an electronic device between a plurality of access requesting devices, comprising the steps of: (a) receiving a clock signal and generating a select signal in response thereof; (b) receiving a control signal from each of the access requesting devices; and (c) selecting a control signal of one of the access requesting devices to act as a control input to the electronic device, wherein the selection of the one control input is determined by the generated select signal.

Still another aspect of the present invention is a circuit for providing shared access for a plurality of access requesting devices to an electronic device having a control input. The circuit includes means for receiving a clock signal and generating a select signal in response thereof, and means for receiving the select signal as well as a control signal from each of the access requesting devices, and selecting one of the received control signals to be an output of the receiving and selecting means, wherein the selected control signal is determined by the select signal and the resulting output is connected to the control input of the electronic device.

For example, in a preferred embodiment of the invention, the means for receiving the clock signal and generating a select signal in response thereof, comprises a frequency divider circuit which divides the received clock frequency by an integer value equal to the number of access requesting devices to generate the select signal; and the means for receiving the select signal and a control signal from each of the requesting devices, comprises a multiplexer having the select signal connected to its select input and each of the control signals from each of the requesting devices connected to an input of the multiplexer.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
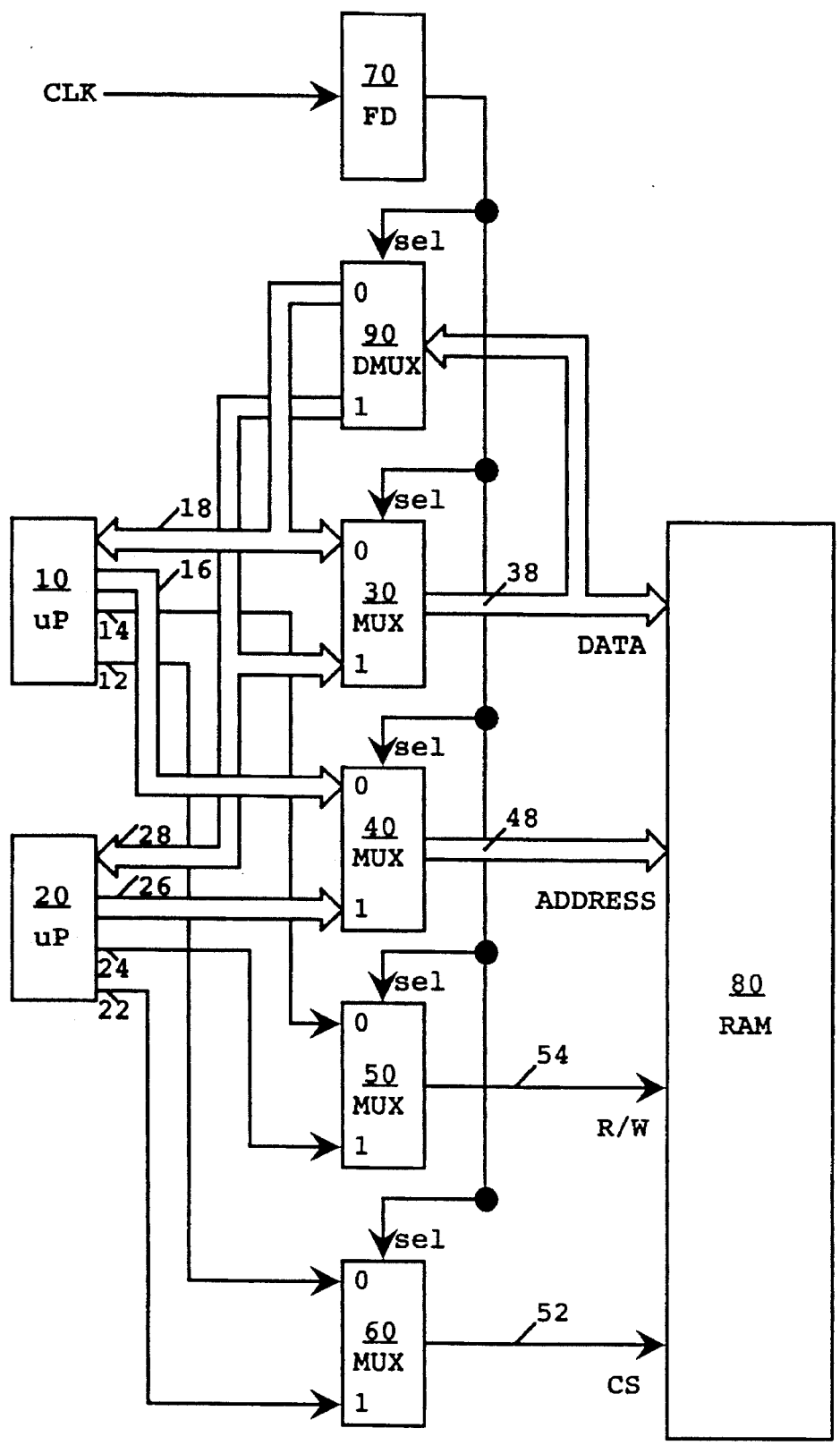
FIG. 1 illustrates, as an example, a block diagram of a computer system utilizing aspects of the present invention.

FIG. 1 illustrates, as an example, a block diagram of a computer system wherein two microprocessors ("μP"), 10 and 20, share access to a random-access-memory ("RAM") 80. Access to the RAM 80 is controlled through multiplexers ("MUX") 30, 40, 50 and 60, and data being read from the RAM 80 is controlled through a demultiplexer ("DMUX") 90.

The RAM 80 receives address information from the MUX 40 over a system address bus 48, a read/write ("R/W") signal from the MUX 50 over control line 54, and a chip select ("CS") signal from the MUX 60 over control line 52. If the R/W signal indicates a write request, the RAM 80 receives data from the MUX 30 over a system data bus 38 and stores the received data at the address provided by MUX 40. On the other hand, if the R/W signal indicates a read request, the RAM 80 retrieves data stored at the address provided by MUX 40 and transmits the stored data to the DMUX 90 over the system data bus 38.

Each MUX, 30, 40, 50 and 60, has a select input ("sel") and two selectable inputs ("0" and "1"). The select input determines which of the two selectable inputs is to be the output of the MUX. For example, if the select input equals a logical 0, then the input to the "0" input becomes the output of the MUX, and when the select input equals a logical 1, the input to the "1" input becomes the output for that MUX. The DMUX 90 also has a select input ("sel"), but instead of two selectable inputs, it has two selectable outputs ("0" and "1").

Each of the access requesting μPs, 10 and 20, have control signals, address lines, and data lines connected to one of the inputs of each of the MUXs, 30, 40, 50 and 60, and the DMUX 90. For example, μP 10 has its CS signal connected to the "0" input of MUX 60 via control line 12, its R/W signal connected to the "0" input of MUX 50 via control line 14, address lines 16 connected to the "0" input of MUX 40, and data lines 18 connected to the "0" input of MUX 30 for writing data to the RAM 80 and to output "0" of DMUX 90 for reading data from the RAM 80. Likewise, μP 20 has its CS signal connected to the "1" input of MUX 60 via control line 22, its R/W signal connected to the "1" input of MUX 50 via control line 24, address lines 26 connected to the "1" input of MUX 40, and data lines 28 connected to the "1" input of MUX 30 for writing data to the RAM 80 and to output "1" of DMUX 90 for reading data from the RAM 80.

In order to simplify the description of the system, only single MUXs are shown connected to the address and data lines of μPs 10 and 20. In actual practice, however, each bit of the address and data lines preferably has a MUX associated with it so that parallel transfer of address information and data can be performed.

Figure 2:
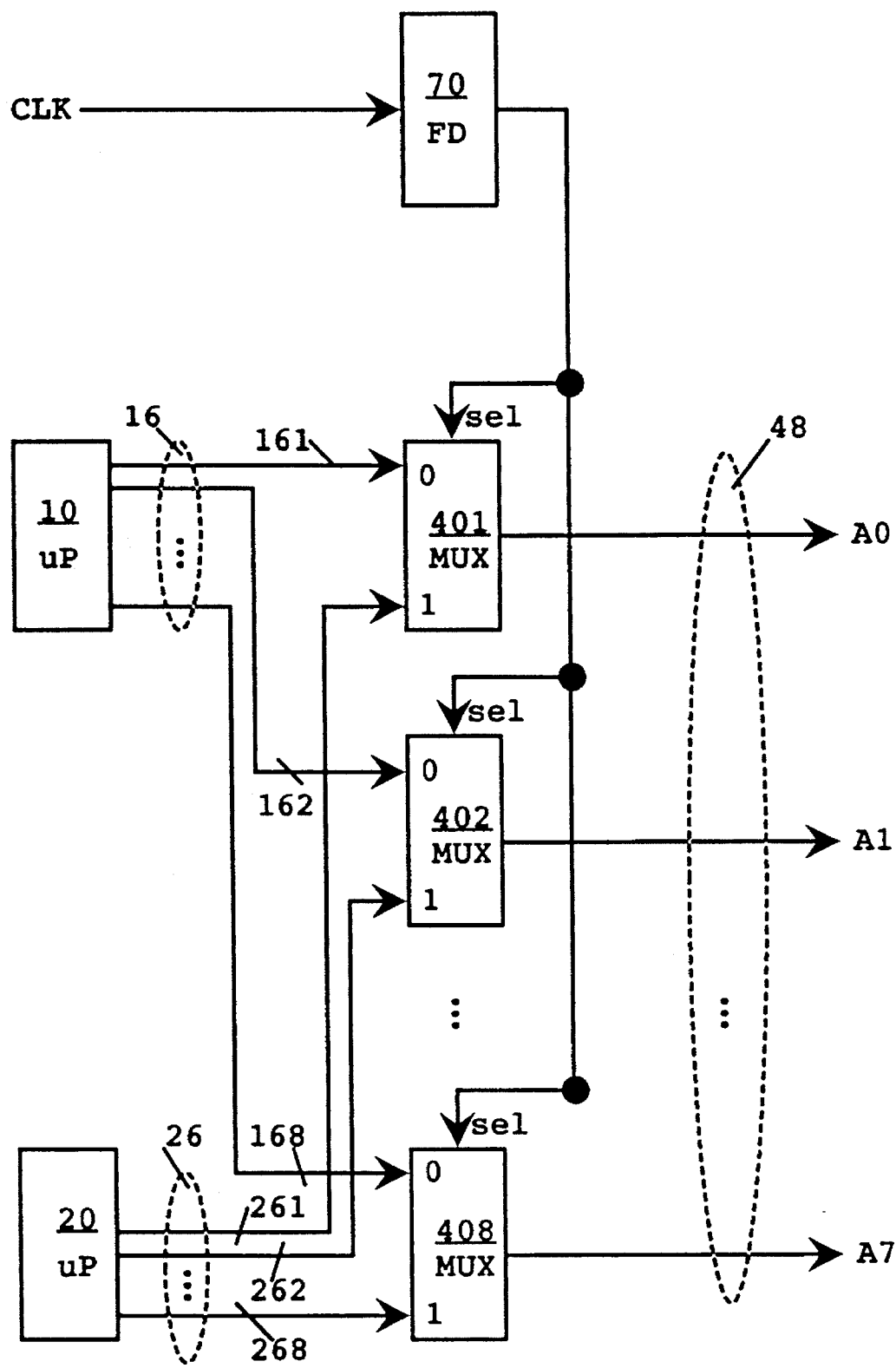
FIG. 2 illustrates, as an example, a block diagram of an address multiplexing circuit utilizing aspects of the present invention.

FIG. 2 illustrates an example where both μPs 10 and 20 have eight address lines. The first address line 161 of μP 10 is shown to be connected to a "0" input of a MUX 401, the second address line 162 of μP 10 to a "0" input of a MUX 402, and so on down to the eighth address line 168 of μP 10 which is connected to a "0" input of a MUX 408. Likewise, the first address line 261 of μP 20 is connected to a "1" input of the MUX 401, the second address line 262 of μP 20 to a "1" input of the MUX 402, and so on down to the eighth address line 268 of μP 20 which is connected to a "1" input of the MUX 408. The output of MUX 401 is then connected to the first address line $A_0$ of the system address bus 48, the output of MUX 402 connected to the second address line $A_1$ of the system address bus 48, and so on down to the output of MUX 408 which is connected to the eighth address line $A_7$ of the system address bus 48.

Each of the MUXs 401, 402, and so on down to MUX 408, has a select input ("sel"). Parallel transfer of address information from μP 10 to the system address bus 48 is accomplished by concurrently setting each of the select inputs to MUXs 401, 402, and so on down to MUX 408, to a "0", and from μP 20 to the system address bus 48 by concurrently setting each of the select inputs to MUXs 401, 402, and so on down to MUX 408, to a "1". Concurrent setting of the select inputs to MUXs 401, 402, and so on down to MUX 408, is accomplished by connecting together each of the select inputs for the MUXs 401, 402, and so on down to MUX 408.

A similar technique and structure could be described for parallel transfer of data to and from μPs 10 and 20 from and to the system data bus 38. For data transfer, however, in addition to a plurality of MUXs for transmitting data from the μPs 10 and 20 along their respective data lines 18 and 28, to the system data bus 38, a plurality of DMUXs for receiving data by the μPs 10 and 20 along their respective data lines 18 and 28, from the system data bus 38 is required.

Referring back now to FIG. 1, each of the MUXs 30, 40, 50 and 60, has a select input ("sel") which determines which of its inputs, "0" or "1", will become its output, and the DMUX 90 has a select input ("sel") which determines which of its outputs, "0" or "1", will be activated to pass through its input. When the select inputs of MUXs 30, 40, 50 and 60, and DMUX 90 are each a "0", μP 10 has exclusive access to the RAM 80 for transmitting or receiving data to or from the RAM 80. Likewise, when the select inputs of MUXs 30, 40, 50 and 60, and DMUX 90 are each a "1", μP 20 has exclusive access to the RAM 80 for transmitting or receiving data to or from the RAM 80.

Figure 3:
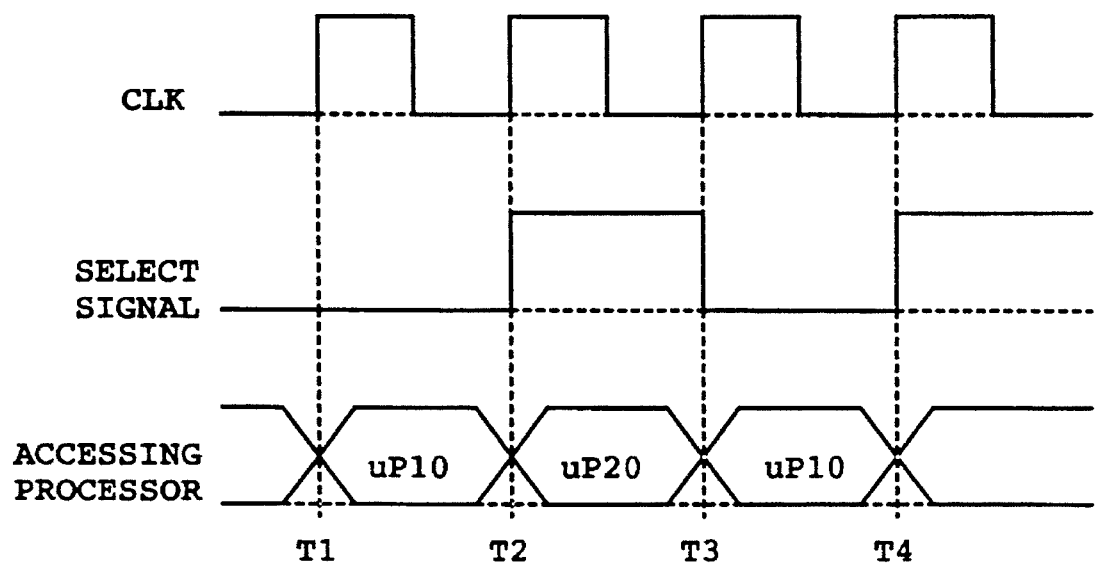
FIG. 3 illustrates timing diagrams, utilizing aspects of the present invention, for selected signals in the example of FIG. 1, wherein two processors share access to a common system resource.

Access to the RAM 80 is alternated between μPs 10 and 20 on a time basis, by connecting together the select inputs to MUXs 30, 40, 50 and 60, and DMUX 90 and then alternating the connected together select inputs between a "0" and a "1". For example, as shown in FIG. 1, the connected together select inputs can be connected to a frequency divider ("FD") 70 being driven by a system clock ("CLK"). By selecting a divide-by-2 circuit for the frequency divider 70, access to the RAM 80 can be alternated between μPs 10 and 20 on each cycle of the system clock CLK. A timing diagram illustrating this example is shown in FIG. 3.

Although the various aspects of the present invention have been described with respect to a preferred embodiment, it will be understood that the invention is entitled to full protection within the full scope of the appended claims. For example, the described method and circuit for controlling shared access to a RAM by two μPs, can be extended to more than two μPs and to other types of shared system resources (e.g., commonly shared registers).

To accomodate more than two μPs (or other access requesting devices), each of the MUXs 30, 40, 50 and 60, would preferably have the same number of inputs as the number of requesting devices, and the DMUX 90 would preferably have the same number of outputs as the number of requesting devices. For example, if there were three requesting devices, then each of the MUXs 30, 40, 50 and 60, would preferably have three inputs (e.g., "0", "1", and "2"), and the DMUX 90 would preferably have three outputs (e.g., "0", "1", and "2").

Figure 4:
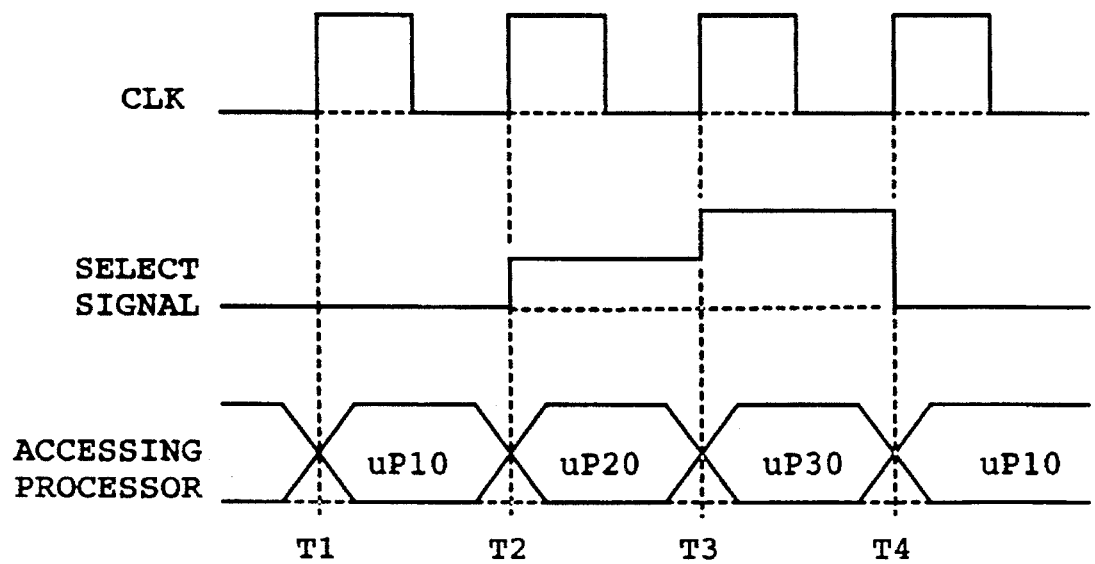
FIG. 4 illustrates timing diagrams, utilizing aspects of the present invention, for selected signals in an example wherein three processors share access to a common system resource.

Access between the three requesting devices can then be alternated on a time basis by connecting the first requesting device (e.g., μP10) to each of the "0" inputs of MUXs 30, 40, 50 and 60, and the "0" output of DMUX 90, the second requesting device (e.g., μP20) to each of the "1" inputs of MUXs 30, 40, 50 and 60, and the "1" output of DMUX 90, the third requesting device (e.g., μP30) to each of the "2" inputs of MUXs 30, 40, 50 and 60, and the "2" output of DMUX 90, and then alternating the connected together select inputs to MUXs 30, 40, 50 and 60, and the DMUX 90 between "0", "1" and "2". For example, the connected together select inputs to MUXs 30, 40, 50 and 60, and the DMUX 90 may be alternated between "0", "1" and "2" by replacing the frequency divider 70 with a resettable counter (not shown) which increments its count on each clock cycle and resets its count after counting from "0" to "2". A timing diagram illustrating this example is shown in FIG. 4.

What is claimed is:

1. A circuit providing shared access for a plurality of access requesting devices individually having an input and at least one output, to an electronic device having a output and at least one input, wherein said output of said electronic device is a data output, said at least one input of said electronic device includes a data input and an address input, said input of individual ones of said plurality of access requesting devices is a data input, and said at least one output of individual ones of said plurality of access requesting devices includes a data output and an address output, said circuit comprising:

means responsive to a clock signal, for generating a select signal having a plurality of voltage levels uniquely corresponding to respective ones of said plurality of access requesting devices;

a first multiplexer circuit having a select input receiving said select signal, a plurality of inputs respectively connected to corresponding outputs of said plurality of access requesting devices, and an output connected to a corresponding one of said at least one inputs of said electronic device, wherein said plurality of inputs of said first multiplexer circuit are respectively connected to corresponding data outputs of said plurality of access requesting devices, and said output of said first multiplexer circuit is connected to said data input of said electronic device;

a demultiplexer circuit having a select input receiving said select signal, an input connected to said output of said electronic device, and a plurality of outputs respectively connected to corresponding inputs of said plurality of access requesting devices, wherein said input of said demultiplexer circuit is connected to said data output of said electronic device, and said plurality of outputs of said demultiplexer circuit are respectively connected to corresponding data inputs of said plurality of access requesting devices; and a second multiplexer circuit having a select input receiving said select signal, a plurality of inputs respectively connected to corresponding address outputs of said plurality of access requesting devices, and an output connected to said address input of said electronic device.

2. The circuit as recited in claim 1, wherein said at least one input of said electronic device includes a control input, said at least one output of individual ones of said plurality of access requesting devices includes a control output, and further comprising a third multiplexer circuit having a select input receiving said select signal, a plurality of inputs respectively connected to corresponding control outputs of said plurality of access requesting devices, and an output connected to said control input of said electronic device.

\* \* \* \* \*